Figure 1:
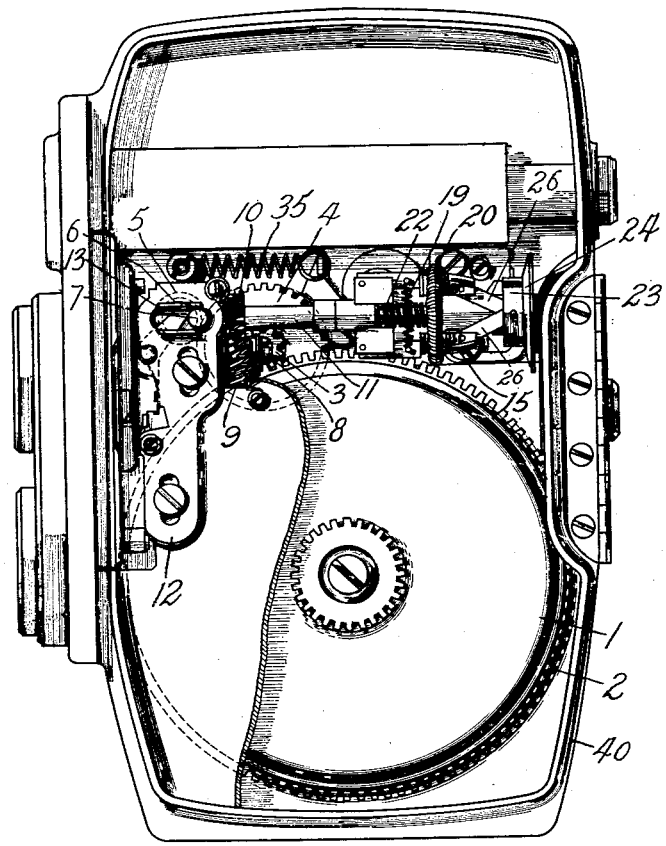

June 27, 1961  HIDEO MIYAUCHI  2,990,035
SPEED GOVERNOR FOR MOTION-PICTURE DEVICES
Filed Oct. 20, 1958  3 Sheets-Sheet 1

INVENTOR
HIDEO MIYAUCHI
BY Stanley Wolder
ATTORNEY

June 27, 1961  HIDEO MIYAUCHI  2,990,035
SPEED GOVERNOR FOR MOTION-PICTURE DEVICES
Filed Oct. 20, 1958  3 Sheets-Sheet 3

INVENTOR
HIDEO MIYAUCHI
BY Stanley Wolder
ATTORNEY

2,990,035
SPEED GOVERNOR FOR MOTION-PICTURE DEVICES
Hideo Miyauchi, Nagano-ken, Japan, assignor to Yashica Co., Ltd., Tokyo, Japan, a corporation of Japan
Filed Oct. 20, 1958, Ser. No. 768,405
Claims priority, application Japan Mar. 11, 1958
4 Claims. (Cl. 188—187)

This invention relates to means for governing frame speed in a photographic apparatus such as a motion picture camera or the like so that accurate speeds may be obtained and kept over wide ranges.

In the conventional motion picture camera, for example, wherein a spring or battery driven motor powers the rotation of the sector shutter and the transport of the film, it is necessary to provide a governor on the rotary shaft system to maintain a constant fixed speed.

Where frame speed is limited to a single speed of 16 frames per second, for example, or varies over narrow limits such as 16 and 24 frames per second, a suitable governor may incorporate a comparatively simple mechanism. However, where the governor must operate over a wide range of speed stages ranging from a low frame speed to a high frame speed and at accurate frame speeds, technical difficulties are encountered which rule out the simple governor. The present invention is intended to provide a mechanism effective to accurately obtain frame speeds over such wide range and to accurately maintain the frame speed produced in a given set range.

The above and other aims are achieved in the preferred form by the provision of a shaft positively connected to a rotary portion of the power train of a motion-picture camera or the like which drives the shutter and film transport means, to which shaft is oppositely pivotably mounted a pair of weights adapted to be urged outward of the shaft and apart from one another when the shaft is rotated and to which weights are pivotally mounted links which pivotally connect to a braking slide or collar, bearing a marking flange, slideably mounted to said shaft and displaced axially thereof toward said weights when they move apart. Three spring systems preferably of different strengths are employed to work against the outward displacement of the weights. The first and weakest is an annular extension spring which is positioned about the weights and engaged by them so as to principally control the displacement of collar at low speeds. The second is a pair of springs extending linearly from pins supported by the weights and thus directly connecting them. These linearly-extending extension springs are of intermediate power and principally control the degree of weight separation and hence collar position during intermediate speeds. The third spring means employed comprise a coil compression spring mounted about the shaft so that it opposes the displacement of the collar towards the weights principally in the higher speed ranges. In conventional fashion the braking flange of the collar contacts a braking shoe when the governor is controlling speed thus slowing down motor speed. The shoe is positioned by the operator so as to be further away from the rest position of the collar in the higher speed ranges and nearer thereto in the lower ranges.

FIG. 1 is an elevational view of a motion-picture camera equipped with a governor embodying the present invention, portions being shown in section to disclose essential parts.

Figure 2:
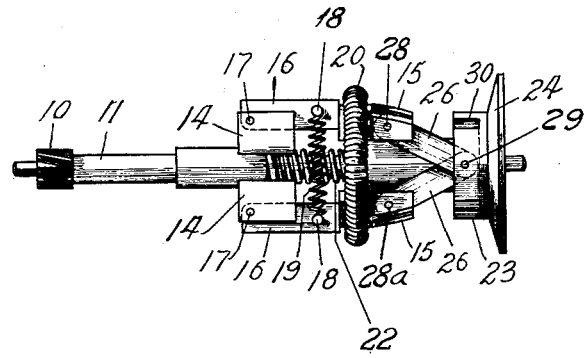
Figure 3:
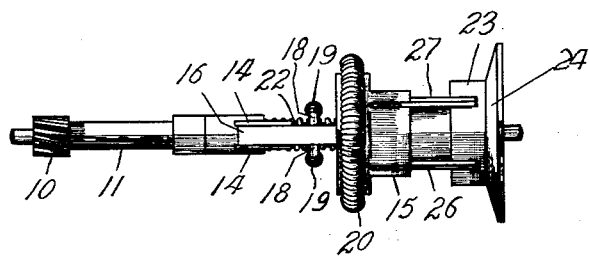
Figure 4:
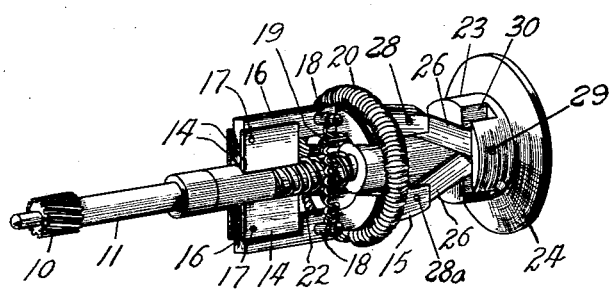
Figure 5:
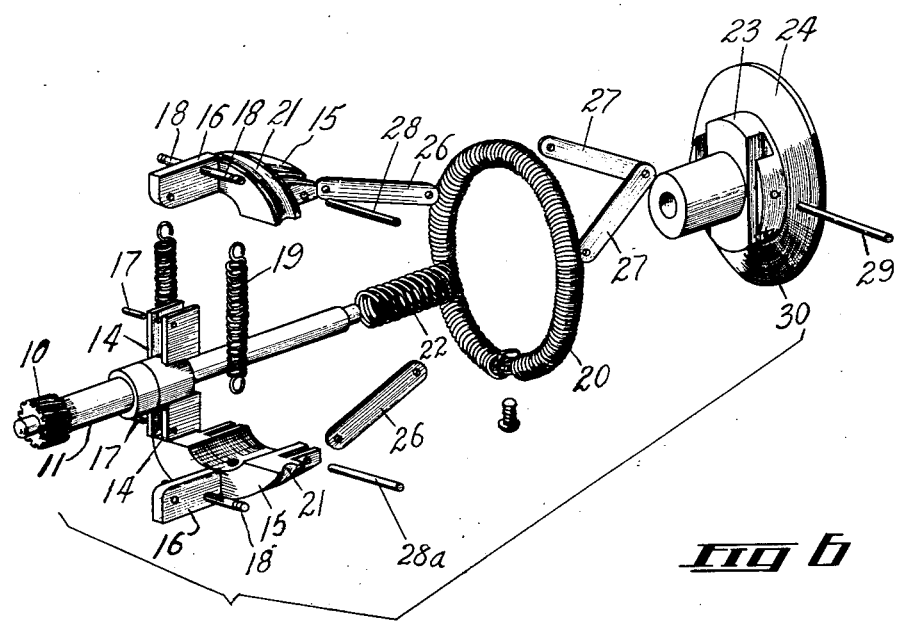
Figure 6:
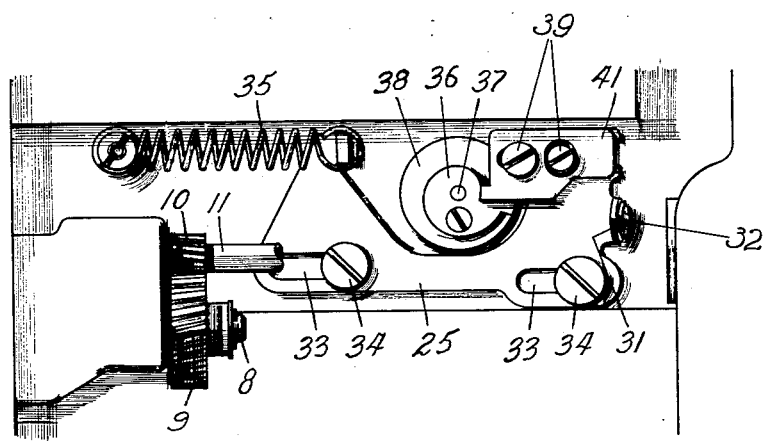

FIG. 2 is a side view of the governor.
FIG. 3 is a plan view of the same.
FIG. 4 is a perspective view of the same.
FIG. 5 is an exploded perspective view.
FIG. 6 is an elevational view showing the mechanism of a controller for controlling the governor.

The preferred embodiment of the present invention is herewith explained in detail with reference to the drawings. In the motion-picture camera illustrated in FIG. 1, a gear 5 in mesh with a gear 4 is in turn rotated by means of a gear 3 in mesh with a gear 2 on a barrel 1. On the rotary shaft of said gear 5 are fixedly mounted a helical gear 6 and a pin 7 projecting in an eccentric position from the same shaft. Said helical gear 6 is meshed with a helical gear (not illustrated) provided on a shutter rotating shaft 8. A governor rotating shaft 11 is driven by a helical gear 9 at the end of said shutter rotating shaft 8 and a helical gear 10 in mesh with said helical gear 9. Eccentric pin 7 on the rotary shaft of the gear 5 is fitted in a slot 13 in a claw 12 so that the claw 12 is reciprocated as said shaft rotates to conventionally actuate the shutter driving and film transport means.

The governor in addition to rotating shaft 11 includes oppositely positioned pairs of ears or supporting members 14 keyed to and extending from shaft 11. A blade 16 provided with an arcuate weight 15 is pivoted to each supporting member 14 by means of a pin 17. Coiled extension springs 19 are linearly hung between pins 18 mounted in bores in blades 16. An annular coiled extension spring 20 is suspended about weights 15 lying in the grooves 21 formed in the outer curved surfaces thereof, and may be fastened to one of said weights as by a machine screw or the like. Weights 15 present substantially a cylindrical form when set opposite one another. According to the present invention, the speed of rotation is to be controlled by means of the types of springs described and another coiled compression spring 22 mounted about the governor rotating shaft 11 and especially by causing said first-described types of springs to cooperate with said coiled spring 22 at high frame-speed ranges. A slidable braking collar 23 bearing a braking flange 24 is loosely fitted on governor-rotating shaft 11 so as to be slidable axially on said shaft along a path toward a controller 25 when links 26 and 27 which are pivotally connected both to weights 15 and collar 23, are pulled outward from shaft 11 as it rotates faster and more centrifugal force is applied to weights 15. The front end of upper link 26 (as shown in FIG. 2) is pivoted to one side of the rear portion of weight 15 and the front end of the link 27 is likewise pivoted to the other side of the rear end portion of said weight by means of a common pin 28. The lower links are similarly pivotally mounted by pin 28a. Each of the pairs of links 26 and 27 come together at the rear and overlap. Each pair is pivoted to the slidable riding collar 23 by means of a pin 29 passed through said collar 23. The rear ends of the links 26 or 27 in each set are engaged with the slidable riding collar 23 within a groove 30 which acts to prevent interference with the action of the sliding advance of the slidable riding collar 23 on the shaft 11 when the weights 15 gradually move away from shaft 11 as a center and separate from each other due to the centrifugal force produced by the rotation of said shaft. Controller 25 bears a rearwardly extending bent tongue 31 on the rear surface of which is a brake shoe 32 of a soft material which engages braking flange 24 of collar 23 when the same is brought forwardly into contact with it. Screws 34 screwed into the camera body are inserted into two longitudinal slots 33 which extend parallel to shaft 11 so that the controller 25 may be slideably mounted to the inner wall of the camera body 40, to ride axially parallel with shaft 11. A spring 35 attached at one end to camera wall 40 and at the other to controller 25 acts to bias the controller in a forward direction. A cam 36 is rotatably mounted along with a dial 38 by means of pin 37 to camera body 40 to adjust the position occupied by the controller 25. A contact shoe 41 is adjustably mounted to controller 25 by means of machine screws 39 so that its rear portion abuts the cam surface of cam 36.

When the centrifugal force derived from the rotation of the governor-rotating shaft 11 separates the weights 15 outward of the shaft, the above-described three types of springs will operate in the respective rotary speed ranges. To insure a sequential action, annular coiled spring 20 is fastened so as to bring the weights 15 normally close to each other while coiled springs 19 which linearly connect weights 15 are mounted with play so that they are tensioned only after the weights 15 have separated from each other by a predetermined amount. Similarly, compression spring 22 on shaft 11 is preferably situated so that its rear end will not contact until after both springs 20 and 19 have been tensioned to some extent.

The power spring (not shown) is contained in the barrel 1 and acts to rotate, when released by the shutter push button (not shown), the shutter rotating shaft 8. The governor described acts in the following fashion. If the shutter push button is pushed to release said spring, the torque will be transmitted to the shutter-rotating shaft 8 through the gears 2, 3, 4 and 5, the helical gear 6 and the helical gear in mesh with said helical gear 6 and at the same time to the governor rotating shaft 11 through the helical gear 9 attached to the end of the shutter rotating shaft 8 and the helical gear 10 on the shaft 11. With the rotation of shaft 11, weights 15 and slidable riding collar 23 will rotate together with the shaft 11 and the centrifugal force acting on the weights 15 will work to separate them from each other. Due to this action of separating them from each other, the slidable riding collar 23 linked by the links 26 and 27 will begin to slide forward along a path in the axial direction of the governor rotating shaft 11, but the amount of the advance will be controlled by the controller 25 with respect to the camera body 40. However, the rest position of controller 25 with respect to collar 23 will depend upon the setting of the frame speed setting dial 38. Thereafter, during actuation of the governor the amount of braking pressure developed between contact shoe 41 integral with controller 25 and braking flange 24 will depend upon the rotational speed of shaft 11 and the strength and position of the various springs. If cam 36 and dial 38 are set to the highest speed position (substantially as shown in FIG. 6) controller 25 will rest in its most forward position and the governor will permit shaft 11 and hence the entire power train of the camera to reach high speed before collar 23 is sufficiently advanced to bring braking flange 24 into contact with brake shoe 32. Conversely, as controller 25 is pushed rearwardly the governor action commences earlier and stabilizes speed at a lower rate. When the above mentioned three types of springs 19, 20 and 22 are so suspended as to be stronger in the order of the springs 20, 19 and 22, in the low speed stages or in the range of such photographing frame speeds as, for example, 8, 12 and 16 frames per second, the force fastening the weights 15 will be properly adjusted by properly regulating the peripheral length of the annular coiled spring 20 so that the speeds corresponding to the respective rated rotation setting positions of the dial 38 may be obtained. Now, if the rotation setting position of the dial 38 is set in the range of 16, 24 and 32 frames per second, in accordance with the respective frame speeds, controller 25 will progressively occupy advanced positions, bent tongue 31 and its shoe 32 will commence to slow the forward movement of the slidable riding collar 23 on the shaft at a higher speed. In this range, the tension on annular spring 20 derived from the expanding weights 15 will be no longer the prime regulating force since springs 19 will have taken over the primary control function. When dial 38 is set to higher speeds, as, for example, frame speeds of 32, 48 and 64 frames per second, collar 23 will be free to advance further on shaft 11, but as soon as said range is reached, the front end surface of collar 23 will contact and commence compression of spring 22. The further the advance of the slidable riding collar 23, the more the compression.

By reason of the construction described the use of a single spring over its adjusting limit is avoided and therefore accurate speeds and continuous precision can be expected over a wide range of frame speeds. Further, a precise adjustment in each range can be easily attained by independently properly reducing the length of each spring. Therefore, there is no need to prepare various springs of different materials and tensile strengths. The springs in the present invention are effective to reduce production waste and to simplify the inspection and adjustment during production.

In addition any specific single spring need not be burdened with any adjustment over the limit as is the case when a conventional frame-speed governor is used. Again, dial graduating methods wherein graduations are cut on a setting dial as rotations of predetermined speeds are obtained while measuring the required rotating speeds of the shutter rotating shaft by rotating the dial after assembly need not be used. Frame speed setting dials with definite graduations made thereon can be used. The appearances of the dials of all cameras or other devices may then be uniform.

The adjustment ranges of the respective springs described above have been given only by way of example. It is obvious that the spring strengths need not be in the above-mentioned order. For example, the springs may be arranged in reverse to the order of strengths recited. In short, the springs should be selected and arranged so that the higher the speed range, the stronger should be the spring working against the expansion of the weights.

It would not be a departure to make annular spring 20 in the form of two normally linear (or bent) springs attached at each end to one of the weights so as to provide together an annular spring.

Although the present invention has been described with a certain degree of particularity, it is understood that the present disclosure has been made only by way of example and that numerous variations may be employed without transcending the scope of the invention as hereinafter claimed.

What is claimed is:

1. A centrifugal governor for motion-picture apparatus comprising a rotatable shaft, a pair of weights pivotally connected to radially opposite sides of said shaft so as to be urged away from one another by centrifugal force as said shaft is rotated, a braking collar axially slideably mounted to said shaft, a plurality of links pivotally connecting said weights and collar whereby as said weights move away from one another said collar is displaced along a predetermined path, compression spring means mounted about said shaft in said path, one end of said compression spring means confronting said collar, detent means radially extending from said shaft confronting the other end of said compression spring means, and extension spring means extending linearly in a direction normal to the axis of said shaft connecting said weights, annular extension spring means mounted radially about said weights abutting the same and being extended by said weights as they travel apart, all of said spring means being of unequal strength, said spring means being positioned so that as said shaft is rotated from slow to faster speeds, said spring means are sequentially actuated in inverse order of strength.

2. A governor as described in claim 1, the weakest spring means being said annular spring means and the strongest spring means being said compression spring means.

3. A centrifugal governor for use in combination with motion-picture apparatus having a power train driving rotary means to actuate a shutter and film transport means and including a brake shoe readily positionable by the operator to set frame rate comprising a rotatable shaft adapted to be driven by said rotary means, a pair of weights pivotally connected to radially opposite sides of said shaft so as to be urged away from one another by centrifugal force as said shaft is rotated, a braking collar axially slideably mounted to said shaft, a plurality of links pivotally connecting said weights and collar whereby as said weights move away from one another said collar is displaced along a path toward said shoe, compression spring means mounted about said shaft in said path one end of said compression spring means confronting said collar, detent means radially extending from said shaft confronting the other end of said compression spring means, and extension spring means extending linearly in a direction normal to the axis of said shaft connecting said weights, annular extension spring means mounted radially about said weights abutting the same and being extended by said weights as they travel apart, all of said spring means being of unequal strength, said spring means being positioned so that as said shaft is rotated from slow to faster speeds, said spring means are sequentially actuated in inverse order of strength.

4. A governor as described in claim 3, the weakest spring means being said annular spring means and the strongest spring means being said compression spring means.

References Cited in the file of this patent

UNITED STATES PATENTS

| | | |
|---|---|---|
| 1,253,328 | Woods | Jan. 15, 1918 |
| 1,957,871 | Wittel | May 8, 1934 |
| 2,025,347 | Heinzmann | Dec. 24, 1945 |
| 2,159,863 | Schilling | May 23, 1939 |
| 2,180,005 | Gunnarson | Nov. 14, 1939 |
| 2,477,102 | Trevitt | July 26, 1949 |

FOREIGN PATENTS

| | | |
|---|---|---|
| 162,398 | Great Britain | May 2, 1921 |